United States Patent
Medvedkin et al.

(10) Patent No.: US 11,539,660 B2
(45) Date of Patent: Dec. 27, 2022

(54) LOCKLESS STATEFUL NETWORK ADDRESS TRANSLATION

(71) Applicant: Intel Corporation, Santa Clara, CA (US)

(72) Inventors: Vladimir Medvedkin, Limerick (IE); Andrey Chilikin, Limerick (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/222,962

(22) Filed: Apr. 5, 2021

(65) Prior Publication Data

US 2021/0226917 A1 Jul. 22, 2021

Related U.S. Application Data

(62) Division of application No. 16/394,715, filed on Apr. 25, 2019, now abandoned.

(51) Int. Cl.
*H04L 61/2517* (2022.01)
*H04L 61/256* (2022.01)
*H04L 61/50* (2022.01)

(52) U.S. Cl.
CPC ........ *H04L 61/2517* (2013.01); *H04L 61/256* (2013.01); *H04L 61/50* (2022.05)

(58) Field of Classification Search
CPC ............. H04L 61/2514; H04L 61/2517; H04L 61/255; H04L 47/35; H04L 63/0263; H04L 47/32
See application file for complete search history.

(56) References Cited

U.S. PATENT DOCUMENTS

| 8,661,160 B2 | 2/2014 | Mann |
| 9,614,761 B1 | 4/2017 | Kamisetty et al. |
| 9,712,460 B1 * | 7/2017 | Friend .................. H04L 47/35 |

(Continued)

FOREIGN PATENT DOCUMENTS

KR 101019251 B1 3/2011

OTHER PUBLICATIONS

Anonymous: "Receive-Side Scaling Enhancements in Windows Server 2008", A 1-15 Internet Citation, Nov. 5, 2008 (Nov. 5, 2008), pp. 1-18, XP002538803, Retrieved from the Internet: URL:http://download.microsoft.com/download/a/d/f/adf1347d-08dc-41a4-9084-623b1194d4b2/RSS_Server2008.docx [retrieved on Jul. 23, 2009] *figure 8*.

(Continued)

*Primary Examiner* — Mahran Y Abu Roumi
(74) *Attorney, Agent, or Firm* — Compass IP Law PC (57) ABSTRACT

Examples include a computing system having a plurality of processing cores and a memory coupled to the plurality of processing cores. The memory has instructions stored thereon that, in response to execution by a selected one of the plurality of processing cores, cause the following actions. The selected processing core to receive a packet and get an original tuple from the packet. When no state information for a packet flow of the packet exists in a state table, select a new network address as a new source address for the packet, get a reverse tuple for a reverse direction, select a port for the packet from an entry in a mapping table based on a hash procedure using the reverse tuple, and save the new network address and selected port. Translate the packet's network address and port and transmit the packet.

18 Claims, 8 Drawing Sheets

(56) References Cited

U.S. PATENT DOCUMENTS

2017/0078245 A1* 3/2017 Wan .................... H04L 61/2514
2017/0093792 A1  3/2017 Marom
2020/0112540 A1* 4/2020 Venkataraman .... H04L 63/0263

OTHER PUBLICATIONS

Extended European Search Report for Patent Application No. 20161586.1, dated Jun. 8, 2020, 9 pages.
First Office Action for U.S. Appl. No. 16/394,715, dated Jul. 8, 2020, 17 pages.
Notice of Allowance for U.S. Appl. No. 16/394,715, dated Sep. 15, 2020, 9 pages.
Notice of Allowance for U.S. Appl. No. 16/394,715, dated Sep. 23, 2020, 5 pages.
European First Office Action for Patent Application No. 20161586.1, dated Sep. 20, 2021, 7 pages. (EP Exam Report Article 94(3) EPC).
European Patent Office Summons to Attend Oral Proceedings for Patent Application No. 20161586.1, dated Sep. 9, 2022, 6 pages.

* cited by examiner

LOCKLESS STATEFUL NETWORK ADDRESS TRANSLATION

CLAIM OF PRIORITY

This application is a divisional of U.S. patent application Ser. No. 16/394,715, filed on Apr. 25, 2019. This application is herein incorporated by reference in its entirety.

BACKGROUND

The field of invention relates generally to network address translation in computing systems, and, more specifically, to performing stateful network address translation without using locks in a multicore computing system.

Network address translation (NAT) is a technique used to translate Internet Protocol (IP) addresses or other fields of packets in network gateway devices. IP NAT is a common workload in telecommunications networks and can be implemented as a separate network function or can be a part of multiple network functions, such as virtualized evolved packet core (vEPC) functions, virtualized broadband network gateway (vBNG) functions, etc. General NAT operations, such as Internet Protocol version 4 (IPv4) to IPv4 or IPv4 to Internet Protocol version 6 (IPv6) translation, and QinQ combination on the access side of the network to multi-protocol layer switching (MPLS) on the core side of the network, are commonly used.

As NAT is an essential part of the fast data processing pipeline for multiple network components, a non-optimized implementation can affect overall system performance. In the case of stateless network addresses, operations on the network addresses such as translations do not require complex processing and a simple mapping can be used. In the case of network addresses where stateful translation is needed (e.g., a state is kept in a memory region assigned to a packet flow and needs to be updated with every packet), more careful resource allocation is required to achieve better performance.

There are a number of known open source NAT solutions such as Linux™ netfilter, OpenBSD pf, NetBSD ipf, and FreeBSD ipfw. All known open source NAT solutions suffer from a lack of scalability in a multicore computing environment when packets are steered across cores by a network interface controller (NIC) using a hash filter (such as Receive Side Scaling (RSS) hashing in the case where a Toeplitz hash filter is used). NAT, when implemented as a stateful network function, maintains a state table with state entries for each bidirectional flow. One problem is that packets of the same bidirectional flow but that are being transmitted in different directions could be handled by threads on different processing cores, so some type of mutually exclusive access to the state data must be implemented. Mutual exclusion implementations (such as locks) limit scalability and decrease performance because of interlocking and/or cache thrashing between multiple cores.

DETAILED DESCRIPTION

Embodiments of the present invention provide an approach for binding packet flows to a single processing core regardless of packet flow direction, eliminating the need for mutual exclusion locks in a fast path for packet processing, and avoiding cache trashing by using a local cache for storing stateful information. In general, embodiments of the present invention work on any packet flows that can be defined by an n-tuple which requires translation of a field in the tuple, with one extra field available for the translation process. For example, in the standard 5-tuple for source NAT (SNAT), the source address (IPsrc) field stores the network address to be translated and the source port (PORTsrc) field is used as an extra field. Embodiments shown herein use IPv4 SNAT as an example. For a more generic case, a source tuple field and a destination tuple field may be used instead of an implicit fieldname.

Figure 1:
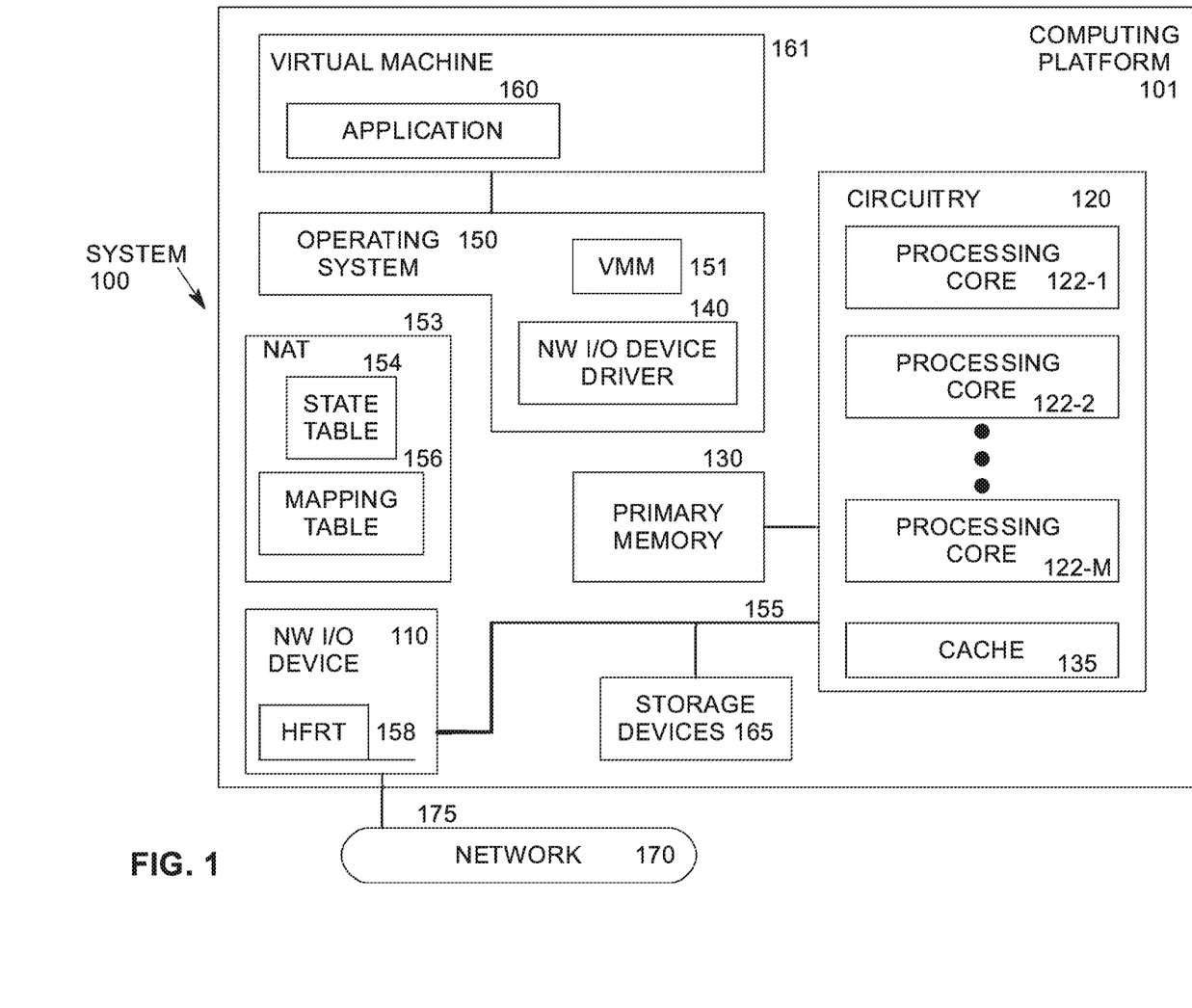
FIG. 1 illustrates an example computing system according to some embodiments.

FIG. 1 illustrates an example computing system 100. As shown in FIG. 1, computing system 100 includes a computing platform 101 coupled to a network 170 (which may be the Internet, for example). In some examples, as shown in FIG. 1, computing platform 101 is coupled to network 170 via network communication channel 175 and through at least one network (NW) input/output (I/O) device 110. In an embodiment, network I/O device 110 comprises a switch, a network interface controller (NIC) having one or more destination ports (not shown) connected or coupled to network communication channel 175. In an embodiment, network communication channel 175 includes a PHY device (not shown). In an embodiment, network I/O device 110 includes an Ethernet NIC. Network I/O device 110 transmits data packets from computing platform 101 over network 170 to other destinations and receives data packets from other destinations for forwarding to computing platform 101. In an embodiment, Network I/O device 110 includes at least one Hash Filter Redirection Table (HFRT) 158.

According to some examples, computing platform 101, as shown in FIG. 1, includes circuitry 120, primary memory 130, operating system (OS) 150, NW I/O device driver 140, virtual machine manager (VMM) (also known as a hypervisor) 151, at least one application 160 running in a virtual machine (VM) 161, NAT 153, and one or more storage devices 165. In one embodiment, OS 150 is Linux™. In an embodiment, NAT 153 is part of the OS. In another embodiment, NAT 153 is a virtual network function (VNF). In another embodiment, OS 150 is Windows® Server. Other OSs may also be used. Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165. In one embodiment, application 160 is a packet processing application operating in user mode.

In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a peripheral component interface express (PCIe) bus conforming to version 3.0 or other versions of the PCIe standard published by the PCI Special Interest Group (PCI-SIG). In some examples, operating system 150, NW I/O device driver 140, NAT 153, VM 161, and application 160 are implemented, at least in part, via cooperation between one or more memory devices included in primary memory 130 (e.g., volatile or non-volatile memory devices), storage devices 165, and elements of circuitry 120 such as processing cores 122-1 to 122-*m*, where "m" is any positive whole integer greater than 2. In an embodiment, OS 150, VMM 151, NW I/O device driver 140, NAT 153, VM 161 and application 160 are executed by one or more processing cores 122-1 to 122-*m*.

In some examples, computing platform 101, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, computing platform 101 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having processing cores 122-1 to 122-*m* may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 120 may include at least one cache 135 to store data.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) crosspoint memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

In some embodiments, NAT 153 performs network address translation operations on a network address contained in a packet received by computing system 101. NAT 153 includes at least one state table 154. In some embodiments, state table 154 is local to a core and not shared among cores. In some embodiments, NAT 153 also includes mapping table 156.

In some implementations of stateful address translation, called Source Network Address Translation (SNAT), a packet includes a first tuple:

{source IP address (IPsrc), destination IP address (IPdst), source port (PORTsrc), destination port (PORTdst)}

The first tuple is translated by NAT 153 into a second tuple for packets flowing in a first direction:

{new source IP address (IPsrc_new), IPdst, new source port (PORTsrc_new), PORTdst}

For the packets flowing in a second, opposite direction, a third tuple is:

{IPdst, IPsrc_new, PORTdst, PORTsrc_new}

Each packet is assigned to a SNAT queue referenced by a Hash Filter Redirection Table (HFRT) 158. In this case, packets flowing in both directions are received either on a single port or on different ports with the same configuration (that is, the same key and HFRT entry). A state table is used in computing system 101 to keep track of the states of connections for packet flows. Network I/O device 110 distributes packets among cores with RSS, which is calculated over tuples, and packets of a single flow but flowing in different directions have different tuples, thereby resulting in. different RSS hash values.

In some known implementations, a form of mutual exclusion, such as locks, are used to ensure that inconsistent results do not occur during processing of the packets by the multiple cores. However, using mutual exclusion to control access to the state table negatively affects performance of computing platform 101 due to contention on the locks.

Embodiments of the present invention provide a new approach to network address translation where a new port is selected from pre-computed hash/port pairs stored in a mapping table 156 for each core. Embodiments leverage the property of a Toeplitz hash function where:

hash (a, b, c, d)=hash (a, 0, 0, 0) ^ hash (0, b, 0, 0) ^ hash (0, 0, c, 0) ^ hash (0, 0, 0, d)

and a queue assignment process implemented by the network I/O device 110 (e.g., the NIC) uses only a predetermined number of least significant bits (LSB) of a calculated hash value to assign a packet to a queue. Therefore, to bind two different tuples to a particular processing core of computing system 101 (that is, to assign the packet to the same queue):

hash (a, b, c, d) & LSB_mask must be equal to hash (e, f, g, h) & LSB_mask

For example, a SNAT case tuple of a first directed flow is
{$IPsrc_1$=p, $IPdst_1$=q, $PORTsrc_1$=r, $PORTdst_1$=s}
and a tuple for the second, reverse directed flow is
{$IPsrc_2$=q, $IPdst_2$=t, $PORTsrc_2$=s, $PORTdst_2$=u}
where $PORTdst_2$=u is a port determined in embodiments described herein.

Embodiments of the present invention select the $PORTdst_2$=u value such that the LSB of the hash value of the first tuple and of the second tuple are the same. This ensures bidirectional packet flows are assigned to the same core, thereby removing the need for the use of a mutual exclusion technique, such as locks. This improves system efficiency.

Figure 2:
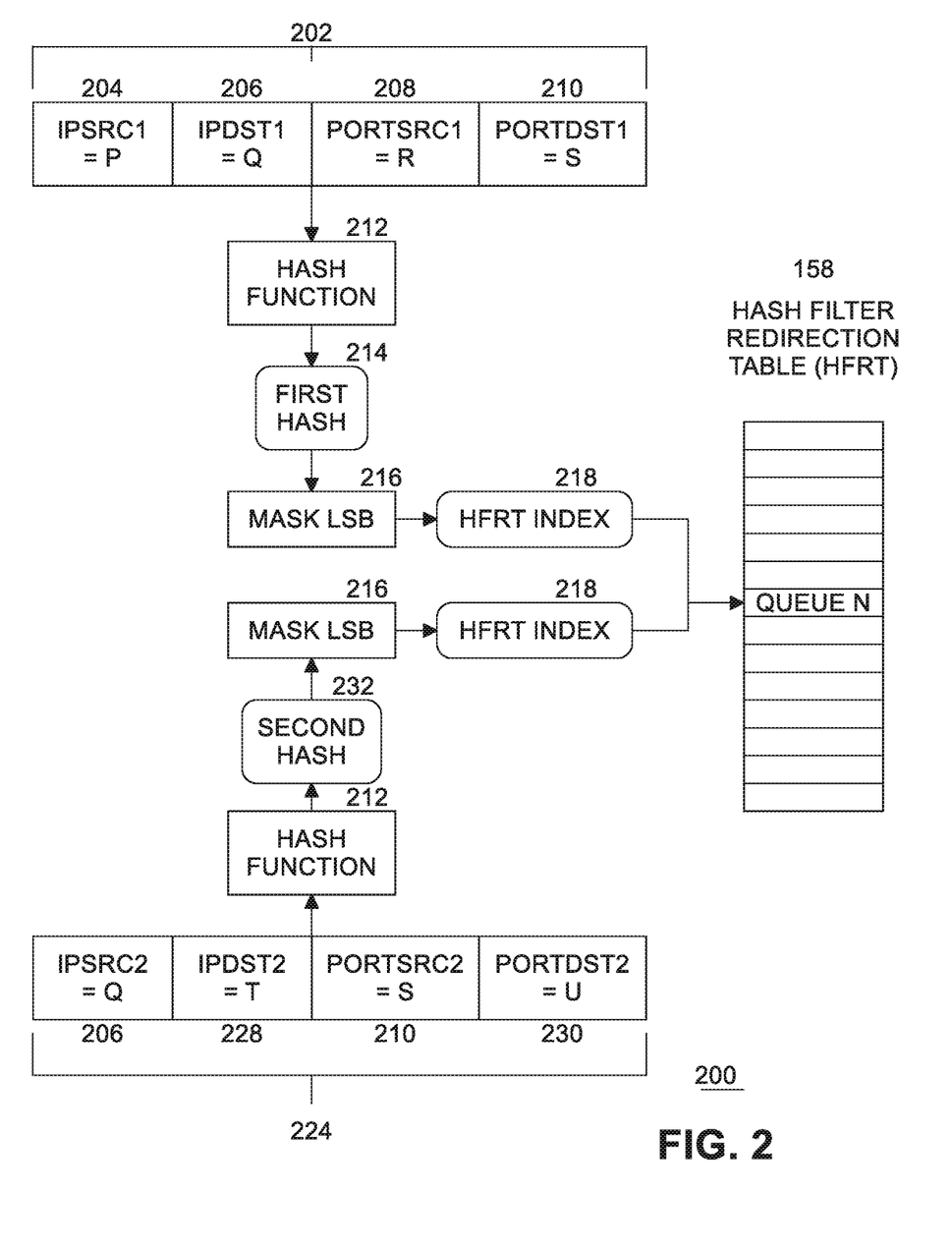
FIG. 2 illustrates an example of network address translation according to some embodiments.

FIG. 2 illustrates an example 200 of network address translation (NAT) 153 according to some embodiments. A first packet flowing in a first direction includes packet header information 202 forming a first tuple including $IPsrc_1$=p 204, $IPdst_1$=q 206, $PORTsrc_1$=r 208, and $PORTdst_1$=s 210. Packet header information 202 is input to hash function 212. In some embodiments, hash function 212 implements RSS hashing. Hash function 212 produces first hash 214 based on the packet header information 202 from the first packet. The least significant bits (LSBs) of first hash 214 are masked by mask LSB 216 to produce an index 218 into HFRT 158. In an embodiment, the number of LSBs to be masked is implementation dependent. The entry in HFRT 158 pointed to by HFRT index 218 includes an indicator of a queue N in network I/O device 110 where the packet is to be sent for subsequent processing. HFRT 158 is used to map the LSBs of a hash signature (hash value for particular tuple) to a queue number. Each queue is associated with a processing core.

A reply packet flowing in a reverse direction (opposite to the first direction) includes packet header information 224 forming a second tuple including $IPsrc_2=q$ 206, $IPdst_2=t$ 228, $PORTsrc_2=s$ 210, and $PORTdst_2=u$ 230. Previously p was translated to t as part of the source NAT process. The original packet's source address was translated to "t", so the reply packet will be destined to "t". In embodiments of the present invention, the $PORTdst_2$ value of u is selected such that the masked hash of second packet header information 224 is the same as the masked hash of first packet header information 202 (despite two of the four values of the tuples being different). In an embodiment, this is called symmetric translation. Thus, second packet header information 224 is input to hash function 212. Hash function 212 produces second hash 232 based on the packet header information 224 from the second packet. The LSBs of second hash 232 are masked by mask LSB 216 to produce an index 218 into HFRT 158 in network I/O device 110. The entry in HFRT 158 pointed to by HFRT index 218 includes an indicator of a queue N where the packet is to be sent for subsequent processing. Since the HFRT index 218 is the same value for the first packet and for the second packet, the same entry in HFRT 158 is selected and the same queue (assigned to the same core) is used for processing of the first and second packets.

Figure 3:
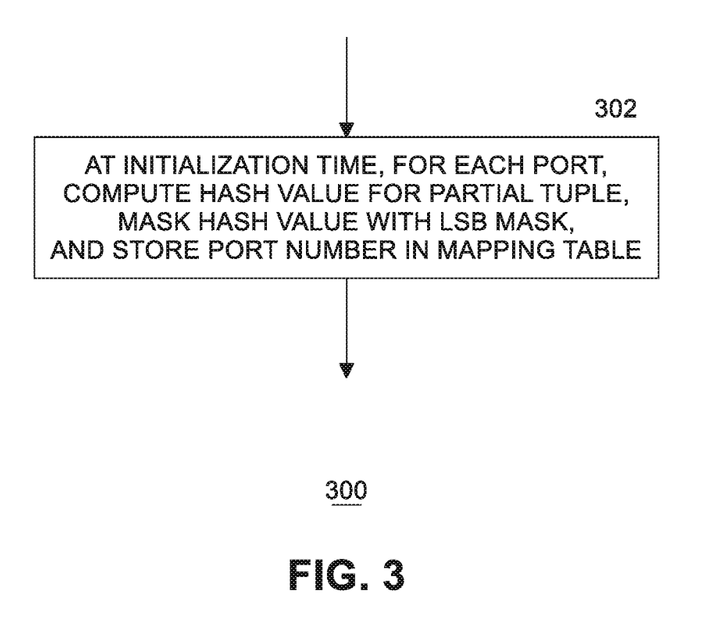
FIG. 3 is a flow diagram of a first example of initializing a mapping table according to some embodiments.

FIG. 3 is a flow diagram 300 of a first example of generating and initializing a mapping table 156 according to some embodiments. In some embodiments, a mapping table 156 for each core is stored in primary memory 130 and accessible by NAT 153. Mapping table 156 is a key-value table where a key is a masked hash value for a partial tuple and a value is a port. At block 302, at initialization time, NAT 153 computes a hash value for a partial tuple including a port number of a current port as a destination port, masks the hash value of the partial tuple with a LSB mask, and stores the port number in an entry for the current port in a mapping table. LSBs of the partial tuple hash are used as the key. Thus, each entry in the mapping table 156 associates a partial tuple hash value with a port (e.g., a port number). These actions are performed for each port. In at least one embodiment, each entry in a mapping table 156 stores a mapping of a port (e.g., a port number) to a hash value of a partial tuple.

Figure 4:
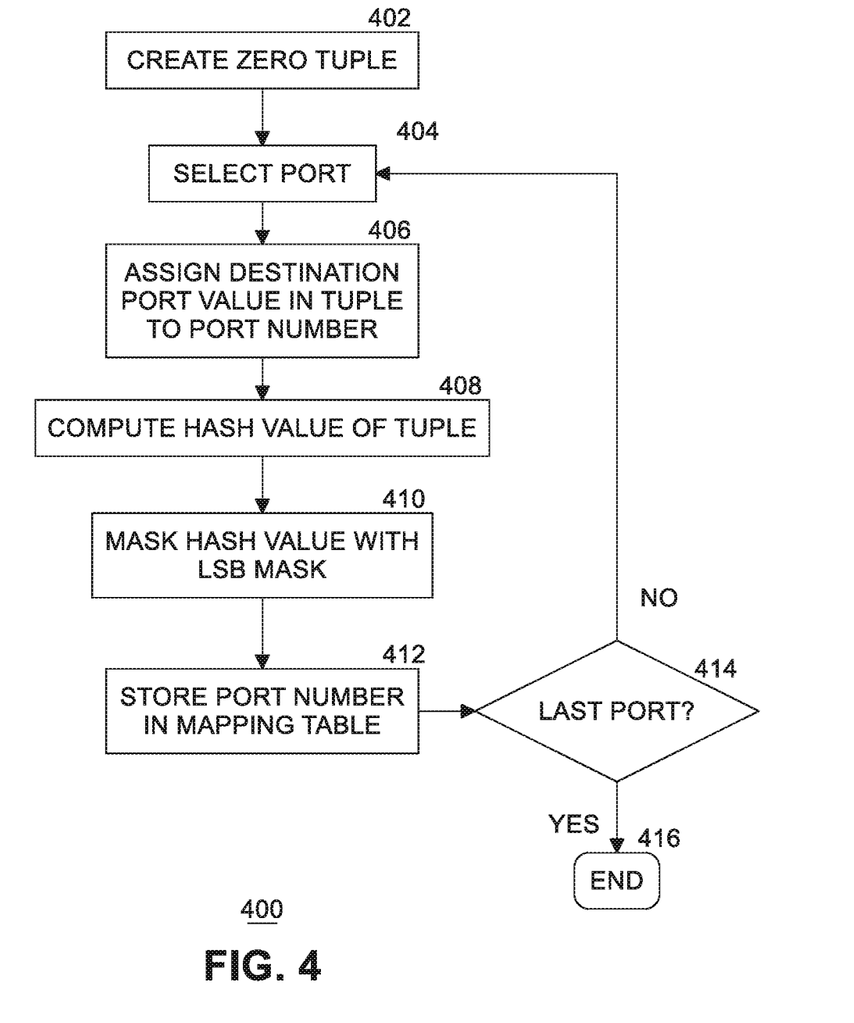
FIG. 4 is a flow diagram of a second example of initializing a mapping table according to some embodiments.

FIG. 4 is a flow diagram 400 of a second example of generating and initializing a mapping table 156 according to some embodiments. FIG. 4 provides further details to the operations described in FIG. 3. At the initialization stage, a computation of the partial hash value is performed for each destination port (PORTdst) to be used in NAT:

Partial_Hash=Fhash (0, 0, 0, dport) & LSB_MASK
storing possible PORTdst/Partial_Hash pairs in mapping table 156.

At block 402, NAT 153 creates a zero tuple (IPsrc=0, IPdst=0, PORTsrc=0, PORTdst=0). At block 404, NAT 153 selects a port (e.g., by a port number). At block 406, NAT 153 assigns a destination port value (PORTdst) in the created tuple to the currently selected port. At block 408, NAT 153 computes the hash value of the tuple {IPsrc=0, IPdst=0, PORTsrc=0, PORTdst=current port number}. At block 410, NAT 153 masks the hash value with a LSB mask. In an embodiment, the number of LSBs to be masked is implementation dependent (and depends on the network I/O device 110 implementation (e.g., a NIC)). At block 412, NAT 153 stored the current port number in an entry in the mapping table 156. At block 414, if the currently selected port is not the last port to be processed, then processing continues with the next port at block 404. Otherwise, processing ends at block 416. The mapping table 156 is now populated with masked partial hash value/port pairs in each entry, thereby associated each port (e.g., a port number) with a masked partial hash value. In an embodiment, the number of entries in the mapping table 156 is determined by a number of used ports (in general, this may be based on the size of the port address (e.g., the number of unique port addresses), but in some embodiments only a subset of the ports is used. In an embodiment, the number of entries in the mapping table is 64K.

Figure 5:
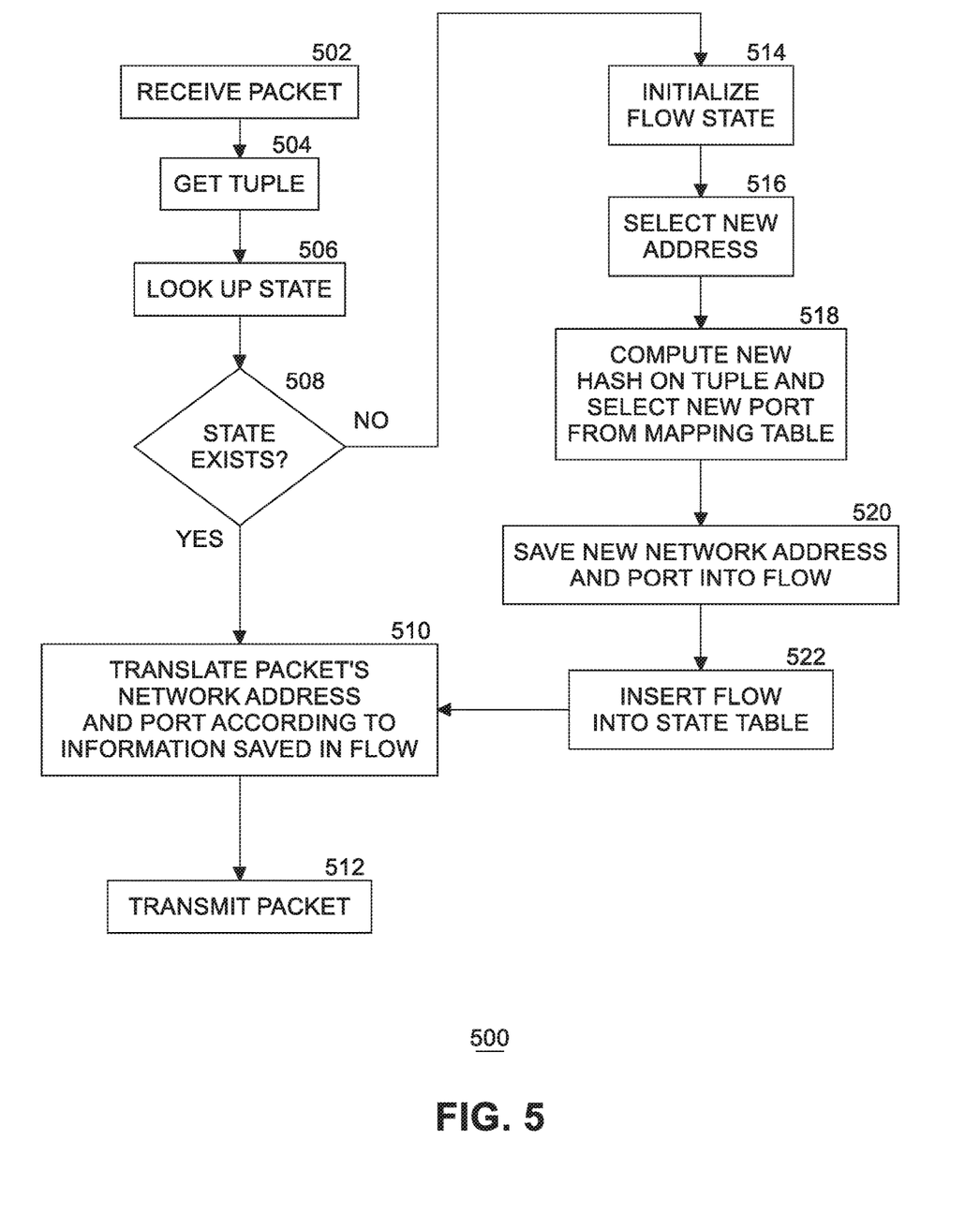
FIG. 5 is a flow diagram of network address translation according to some embodiments.

FIG. 5 is a flow diagram 500 of network address translation according to some embodiments. At block 502, NAT 153 receives a packet. At block 504, NAT 153 gets a (e.g., original, first direction of packet flow) tuple from the first packet. In an embodiment, the tuple is stored in the packet header. At block 506, NAT 153 looks up the state (e.g., connection) for the packet in a state table 154 local to the core handling the packet. In some embodiments, the NAT running in each core has its own state table 154. In some embodiments, the NAT running in each core has sole (e.g. non-shared) access to a portion of a global state table shared across cores. In embodiments, information comprising the state is implementation dependent, and may include information such as NAT address and selected new port, time to live, statistics, as well as protocol dependent information such as sequence number, acknowledgment number, window size, etc. At block 508, if the state exists (e.g., there is already an entry in the state table 154 for this packet flow, thus previous packets in this flow have been processed) then block 510 is performed to translate the packet's network address and port according to information saved in the flow. When the packet is an original direction packet, the network address is a source network address and the port is a source port. When the packet is a reverse direction packet (e.g., a reply packet), the network address is a destination network address and the port is a destination port. The packet is then transmitted at block 512, thereby processing a bidirectional packet flow. If the state does not exist at block 508 (e.g., this is the first packet for a new packet flow with this tuple, and no entry is already in the state table 154), processing continues with block 514. At block 514, NAT 153 initializes the flow state to set up the new connection for the packet flow. At block 516, NAT 153 selects a new address according to a NAT configuration to be a new source address (IPsrc_new). In an embodiment, the new address IPsrc_new is obtained from the NAT configuration. The new source address (IPsrc_new) becomes the destination for the reverse direction tuple. The destination address ($IPdst_1$) from the tuple becomes the source address ($IPsrc_2$) for the reverse direction tuple. The destination port ($PORTdst_1$) from the tuple becomes the source port ($PORTsrc_2$) for the reverse direction tuple. At block 518, NAT 153 computes a new hash value on the second (reverse) tuple with a destination port ($PORTdst_2$) set to zero, XORs the new hash value with original tuple hash value, and then masks the LSB. NAT 153 now uses the hash value/port mapping pairs computed during initialization and stored in the mapping table 156 as follows.

Partial_reverse_Hash=(Fhash (IPsrc$_1$, IPdst$_1$, PORTsrc$_1$, PORTdst$_1$) ^ Fhash (IPdst$_1$, IPsrc_new, PORTdst$_1$, 0)) & LSB_MASK Further at block 518, NAT 153 selects a new port (PORTsrc_new) from the mapping table 156 by using the XOR result of the original and reverse hash values as an index into the mapping table to get an associated port number. PORTsrc_new is used for translation. In the original direction, NAT 153 translates the original IPsrc$_1$ into a new IPsrc (according to configuration) and PORTsrc$_1$ into PORTsrc_new (according to the process described herein, not randomly as in other implementations). IPsrc$_1$ and PORTsrc$_1$ are saved into the state entry for this connection. At block 520, NAT 153 saves the new network address and port into the flow. At block 522, NAT 153 inserts information about the packet flow into state table 154. Processing continues with block 510. At 510, in the original direction, NAT 153 translates the original IPsrc$_1$ into a new IPsrc (according to the NAT configuration) and PORTsrc$_1$ into PORTsrc_new (according to the process described herein, not randomly as in other known implementations) and for replied packets translates IPdst into original IPsrc$_1$ and PORTdst into original PORTsrc$_1$.

Figure 6:
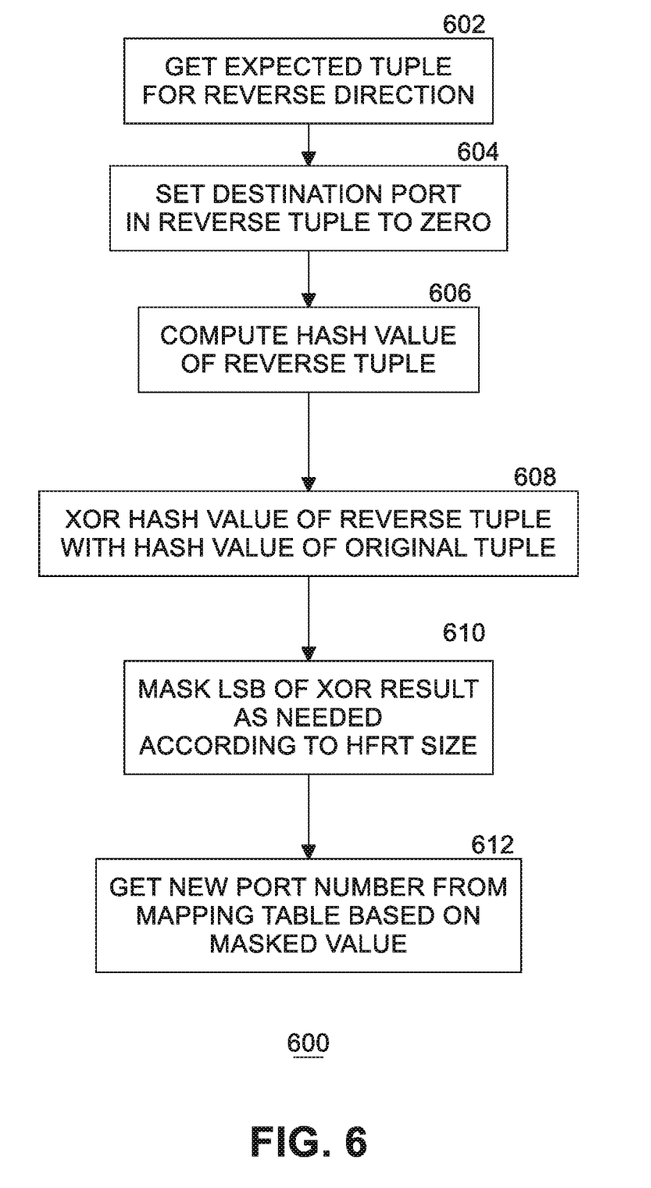
FIG. 6 is a flow diagram of an example of getting a new port number according to some embodiments.

FIG. 6 is a flow diagram 600 of an example of getting a new port number according to some embodiments. FIG. 6 provides further details on block 518 of FIG. 5 in some embodiments. At block 602, NAT 153 gets the expected tuple (e.g., the reverse tuple) from the current packet for the reverse direction. At block 604, NAT 153 sets the destination port of the reverse tuple to zero. At block 606, NAT 153 computes the hash value of the reverse tuple as described above. At block 608, NAT 153 computes an exclusive-OR (XOR) of the hash value of the reverse tuple with the hash value of the original tuple. At block 610, NAT 153 masks the LSBs of the XOR'ed result as needed according to the size of HFRT 158. At block 612, NAT 153 gets the new port number from the mapping table 156 based on the masked value (e.g., the masked value is the index into the mapping table for the current port).

Figure 7:
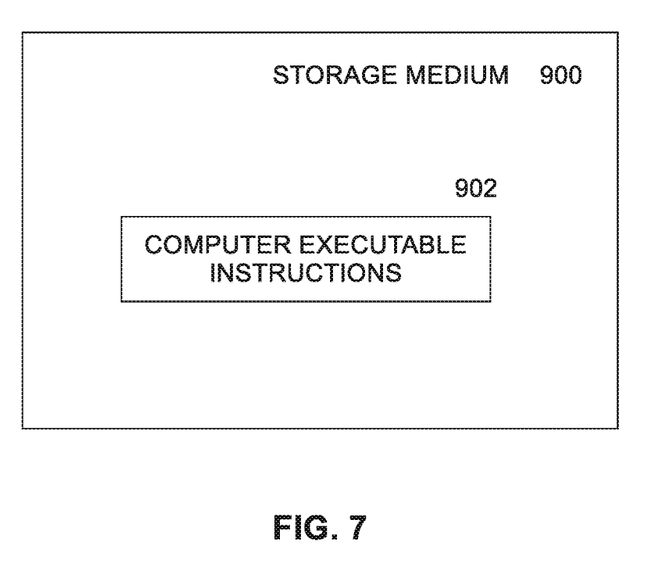
FIG. 7 illustrates an example of a storage medium.

FIG. 7 illustrates an example of a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions 902 to implement logic flows described above in FIGS. 3 through 6. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
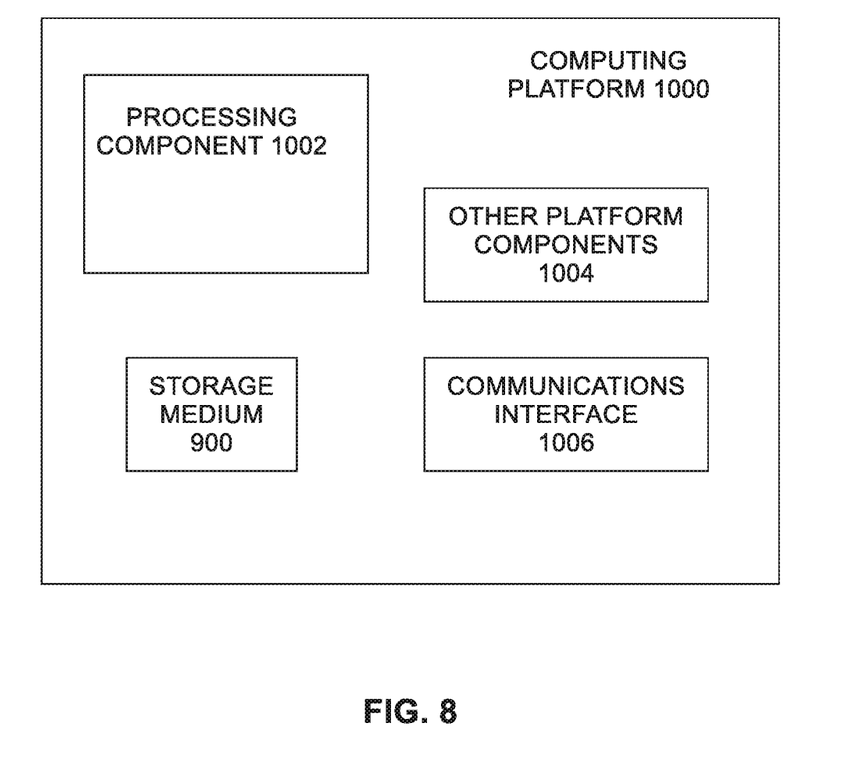
FIG. 8 illustrates another example computing platform.

FIG. 8 illustrates an example computing platform 1000. In some examples, as shown in FIG. 8, computing platform 1000 may include a processing component 1002, other platform components 1004 and/or a communications interface 1006.

According to some examples, processing component 1002 may execute processing operations or logic for instructions stored on storage medium 900. Processing component 1002 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1004 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D crosspoint memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1006 may include logic and/or features to support a communication interface. For these examples, communications interface 1006 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 1000, including logic represented by the instructions stored on storage medium 900 may be implemented using any combination of discrete circuitry, ASICs, logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1000 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
a plurality of processing cores; and
a memory coupled to the plurality of processing cores, the memory having instructions stored thereon that, in response to execution by a selected one of the plurality of processing cores, cause the selected processing core to:
receive a packet;
get an original tuple from the packet;
when no state information for a packet flow of the packet exists in a state table, select a new network address as a new source address for the packet, get a reverse tuple for a reverse direction, select a port for the packet from an entry in a mapping table by applying a Toeplitz hash function using the reverse tuple, entries in the mapping table including pre-computed multi-bit hash value/port pairs, and save the new network address and selected port;
translate the packet's network address and port; and
transmit the packet
wherein when no state information for the packet flow exists in the state table, execution of instructions cause the selected processing core to set a destination port in the reverse tuple to zero, compute a hash value of the reverse tuple, perform an exclusive-OR (XOR) operation on the hash value of the reverse tuple and a hash value of the original tuple, mask a plurality of the least significant bits (LSBs) of the XOR result to select a port for the packet from an entry in the mapping table based on the masked value, save the new network address and selected port into a state associated with a connection of the packet flow, and insert information describing the packet flow into the state table.

2. The computing system of claim 1, the memory having instructions stored thereon that, in response to execution by a selected one of the plurality of processing cores, cause the selected processing core to:
at initialization time, generate the mapping table, the mapping table comprising a plurality of entries, each entry associating a port with a hash value.

3. The computing system of claim 1, the memory having instructions stored thereon that, in response to execution by a selected one of the plurality of processing cores, cause the selected processing core to:
create a tuple having a zero value for a source address, a destination address, a source port, and a destination port, select a port, assign a destination port of the tuple to the selected port, compute a hash value of the tuple, mask the hash value with a least significant bits (LSB) mask, and store a port number into the mapping table entry for the selected port.

4. The computing system of claim 1, wherein the selected processing core to receive an original direction packet is the same processing core to transmit a reverse direction packet.

5. The computing system of claim 1, comprising a network input/output (I/O) device, the network I/O device comprising a hash filter redirection table (HFRT), wherein the masked hash value of an original tuple and the masked hash value of a reverse tuple point to a same entry in the HFRT.

6. The computing system of claim 5, the entry in the HFRT indicating a queue in the network I/O device.

7. A method to be performed by a processor, comprising:
receiving a packet;
getting an original tuple from the packet;
when no state information for a packet flow of the packet exists in a state table, selecting a new network address as a new source address for the packet, getting a reverse tuple for a reverse direction, selecting a port for the packet from an entry in a mapping table by applying a Toeplitz hash function using the reverse tuple, entries in the mapping table including pre-computed multi-bit hash value/port, and saving the new network address and selected port;
translating the packet's network address and port; and
transmitting the packet
wherein when no state information for the packet flow exists in the state table, setting a destination port in the reverse tuple to zero, computing a hash value of the reverse tuple, performing an exclusive-OR (XOR) operation on the hash value of the reverse tuple and a hash value of the original tuple, masking a plurality of the least significant bits (LSBs) of the XOR result to select a port for the packet from an entry in the mapping table based on the masked value, saving the new network address and selected port into a state associated with a connection of the packet flow, and inserting information describing the packet flow into the state table.

8. The method of claim 7, comprising
at initialization time, generating the mapping table, the mapping table comprising a plurality of entries, each entry associating a port with a hash value.

9. The method of claim 7, comprising
creating a tuple having a zero value for a source address, a destination address, a source port, and a destination port, selecting a port, assigning a destination port of the tuple to the selected port, computing a hash value of the tuple, masking the hash value with a least significant bits (LSB) mask, and storing a port number into the mapping table entry for the selected port.

10. The method of claim 7, wherein a selected processing core of a computer system to receive an original direction packet is a same processing core to transmit a reverse direction packet.

11. The method of claim 7, wherein the masked hash value of an original tuple and the masked hash value of a reverse tuple point to a same entry in a hash filter redirection table (HFRT).

12. The method of claim 11, the entry in the HFRT indicating a queue in a network I/O device.

13. At least one non-transitory tangible machine-readable medium comprising a plurality of instructions that in response to being executed by a processor cause the processor to:
receive a packet;
get an original tuple from the packet;
when no state information for a packet flow of the packet exists in a state table, select a new network address as a new source address for the packet, get a reverse tuple for a reverse direction, select a port for the packet from an entry in a mapping table by applying a Toeplitz hash function using the reverse tuple, entries in the mapping table including pre-computed multi-bit hash value/port pairs, and save the new network address and selected port;

translate the packet's network address and port; and transmit the packet;

wherein when no state information for the packet flow exists in the state table, execution of instructions cause the processor to set a destination port in the reverse tuple to zero, compute a hash value of the reverse tuple, perform an exclusive-OR (XOR) operation on the hash value of the reverse tuple and a hash value of the original tuple, mask a plurality of the least significant bits (LSBs) of the XOR result to select a port for the packet from an entry in the mapping table based on the masked value, save the new network address and selected port into a state associated with a connection of the packet flow, and insert information describing the packet flow into the state table.

14. The at least one non-transitory tangible machine-readable medium of claim 13, comprising a plurality of instructions that in response to being executed by a processor cause the processor to:

at initialization time, generate the mapping table, the mapping table comprising a plurality of entries, each entry associating a port with a hash value.

15. The at least one non-transitory tangible machine-readable medium of claim 13 comprising a plurality of instructions that in response to being executed by a processor, cause the processor to:

create a tuple having a zero value for a source address, a destination address, a source port, and a destination port, select a port, assign a destination port of the tuple to the selected port, compute a hash value of the tuple, mask the hash value with a least significant bits (LSB) mask, and store a port number into the mapping table entry for the selected port.

16. The at least one non-transitory tangible machine-readable medium of claim 13, wherein a selected processing core to receive an original direction packet is a same processing core to transmit a reverse direction packet.

17. The at least one non-transitory tangible machine-readable medium of claim 13, wherein the masked hash value of an original tuple and the masked hash value of a reverse tuple point to a same entry in a HFRT.

18. The at least one non-transitory tangible machine-readable medium of claim 17, the entry in the HFRT indicating a queue in a network I/O device.

* * * * *